United States Patent
Hart

(10) Patent No.: US 6,672,560 B1
(45) Date of Patent: Jan. 6, 2004

(54) VIBRATION-ISOLATING MOUNTING BRACKET ASSEMBLY FOR TELEVISION SUPPORTING FRAME

(76) Inventor: James K. Hart, 13208 Tillman Rd. E., Fort Wayne, IN (US) 46816

( * ) Notice: Subject to any disclaimer, the term of this patent is extended or adjusted under 35 U.S.C. 154(b) by 0 days.

(21) Appl. No.: 10/382,694

(22) Filed: Mar. 6, 2003

(51) Int. Cl.[7] ................................................ F16M 1/00
(52) U.S. Cl. ...................................... 248/638; 248/611
(58) Field of Search ................................. 248/638, 634, 248/559, 575, 605, 614, 611

(56) References Cited

U.S. PATENT DOCUMENTS

| | | | |
|---|---|---|---|
| 2,448,281 A | * 8/1948 | Saurer | 248/611 |
| 4,002,831 A | 1/1977 | Aeschliman | |
| 4,447,034 A | * 5/1984 | Gottlob | 248/634 |
| 4,469,303 A | 9/1984 | Snyder | |
| 4,485,999 A | 12/1984 | Isobe | |
| 4,669,697 A | 6/1987 | Suzuki et al. | |
| 4,750,832 A | * 6/1988 | Lloyd et al. | 352/243 |
| 5,009,384 A | 4/1991 | Gerke et al. | |
| 5,215,382 A | * 6/1993 | Kemeny | 384/36 |
| 5,575,547 A | 11/1996 | Hanemaayer | |
| 5,822,023 A | 10/1998 | Suman et al. | |
| 5,847,685 A | 12/1998 | Otsuki | |
| 5,913,503 A | * 6/1999 | Satoh et al. | 248/636 |
| 6,113,047 A | 9/2000 | Wung et al. | |
| 6,199,810 B1 | * 3/2001 | Wu et al. | 248/291.1 |
| 6,416,027 B1 | 7/2002 | Hart | |
| 6,421,848 B2 | * 7/2002 | Farmer | 4/674 |
| 6,530,547 B1 | * 3/2003 | Wada | 248/286.1 |

* cited by examiner

*Primary Examiner*—Anita King
(74) *Attorney, Agent, or Firm*—George Pappas

(57) ABSTRACT

A television supporting frame includes a peripheral frame structure and mounting bracket assemblies extending between opposite portions of the frame structure for mounting a television in a vibration-isolated relationship thereto. Each bracket assembly includes a first mounting rail extending between and rigidly connected to the opposite portions of the frame structure, a second mounting rail extending generally parallel along the first mounting rail and spaced therefrom and from the frame structure and adapted to mount the television. A plurality of vibration-dampening elements are disposed between and interconnect the second mounting rail to the first mounting rail and the opposite portions of the frame structure so as to mount the second mounting rail to be floatably movable along generally orthogonal X, Y and Z axes such that any vibrations imparted to the frame structure will be prevented from reaching the second mounting rails and the television mounted thereto.

20 Claims, 3 Drawing Sheets

FIG. 2

VIBRATION-ISOLATING MOUNTING BRACKET ASSEMBLY FOR TELEVISION SUPPORTING FRAME

TECHNICAL FIELD

The present invention relates generally to the technical field of apparatus for supporting a television so it can be selectively moved between stored and viewing positions and, more particularly, is directed to a vibration-isolating mounting bracket assembly for a flat bed type television supporting frame.

BACKGROUND OF THE INVENTION

When a flat bed type television is located in a relatively small room or area where a considerable amount of activity occurs, such as a hospital room or a recreational vehicle, it is common practice to mount the television from a wall or ceiling by use of a pivotally-mounted frame. The frame is mounted to the wall or ceiling for undergoing pivotal movement between a retracted storage position and an extended viewing position. The frame also typically mounts a panel to provide the appearance of a cover or door that will conceal the television while in the storage position.

U.S. Pat. No. 6,416,027 to Hart, who is also the inventor of the present invention, discloses an apparatus that employs a pivotally-mounted frame for supporting a flat bed type television for movement between retracted storage and extended viewing positions relative to a stationary support structure such as a wall or ceiling. The frame of this patented apparatus includes a pair of outer left and right members, a pair of back and front members extending transversely between and rigidly connected to the outer left and right members and a pair of inner left and right members spaced inwardly from and extending generally parallel to the outer left and right members and extending transversely between and rigidly connected to the back and front members so as to form a rigid rectangular-shaped frame structure. The ends of the outer left and right members located adjacent the back member extend there beyond and are pivotally mounted to the support structure about a common axis of rotation. The various members of the frame structure have suitable means for mounting the television thereto along one of a pair of opposite faces of the frame structure.

The frame of this patented television supporting apparatus has satisfactorily performed its intended function as part of this apparatus. However, one drawback is that when the apparatus is used in a recreational vehicle subjected to a mobile vibratory environment the frame will tend to transfer vibrations from the wall or ceiling of the vehicle to the television. These vibrations may adversely affect certain components of flat bed type televisions, such as those employing plasma type screens.

Accordingly, a need exists for a further innovation which will eliminate the aforementioned drawback of the frame of the television supporting apparatus of the above-cited patent.

SUMMARY OF THE INVENTION

It is the principal object of the present invention to overcome the above-discussed drawback of the frame of the patented television supporting apparatus by incorporating mounting bracket assemblies in the apparatus which provide vibration isolation between its frame and the television. The mounting bracket assemblies are provided with L-shaped fixed mounting rails and corresponding L-shaped floating mounting rails and with rubber isolator elements extending there between in X, Y and Z directions thereby providing vibration isolation between the frame and a television mounted on the floating mounting rails of the assemblies.

Accordingly, the present invention is directed to a television supporting frame which comprises a peripheral frame structure and at least a pair of mounting bracket assemblies extending between opposite portions of the peripheral frame structure for mounting a television in a vibration-isolated relationship to the peripheral frame structure. Each of the mounting bracket assemblies includes a first mounting rail extending between and rigidly connected to the opposite portions of the peripheral frame structure, a second mounting rail extending generally parallel to and along the first mounting rail and spaced therefrom and from the peripheral frame structure and adapted to mount the television, and a plurality of vibration-dampening elements disposed between and interconnecting the second mounting rail to the first mounting rail and to the opposite portions of the peripheral frame structure so as to mount the second mounting rail to be floatably movable along generally orthogonal X, Y and Z axes such that any vibrations imparted to the peripheral frame structure will be substantially prevented from reaching the second mounting rails and the television mounted thereto.

BRIEF DESCRIPTION OF THE DRAWINGS

The above mentioned and other features and objects of this invention and the manner of obtaining them will become more apparent and the invention itself will be better understood by reference to the following description of embodiment(s) of the invention taken in conjunction with the accompanying drawings wherein:

FIG. 2 is an enlarged plan view of one of the mounting bracket assemblies.

DETAILED DESCRIPTION OF SPECIFIC EMBODIMENTS

Figure 1:
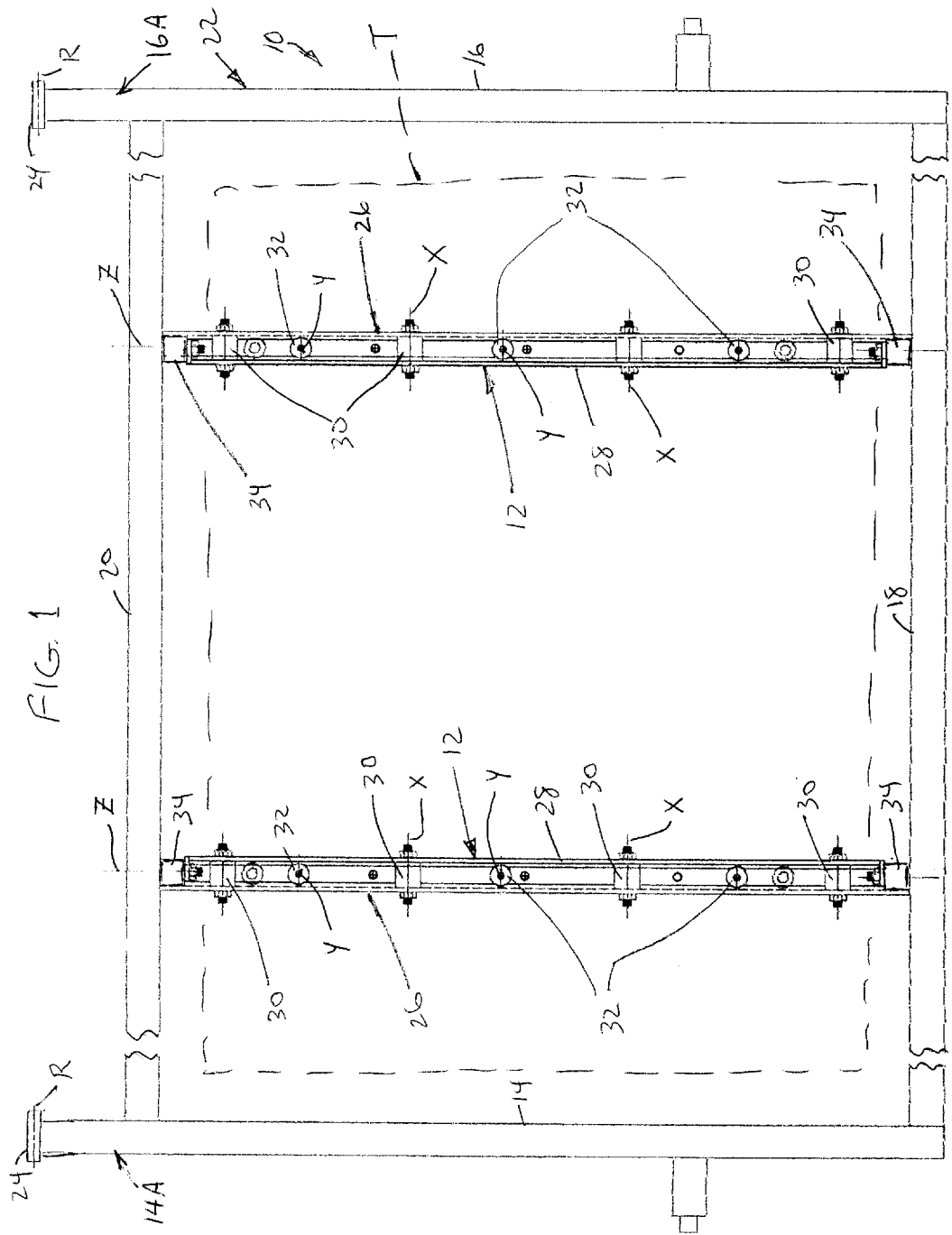
FIG. 1 is a plan view of a television supporting frame of the present invention incorporating a pair of vibration-isolating mounting bracket assemblies for supporting the television on the frame such that it is isolated from vibrations transmitted along each of orthogonal X, Y and Z axes.

Referring initially to FIG. 1, there is illustrated a television supporting frame, generally designated 10, being constructed in accordance with the principles of the present invention and employing a pair of vibration-isolating mounting bracket assemblies. In addition to the pair of mounting bracket assemblies 12, the television supporting frame 10 includes a pair of outer left and right frame members 14, 16 and a pair of front and rear frame members 18, 20 extending transversely between and rigidly connected to the outer left and right frame members 14, 16 so as to form therewith a rigid rectangular-shaped peripheral frame structure 22. Each of the outer left and right frame members 14, 16 and front and rear frame members 18, 20 is preferably constructed from cross-sectionally rectangular-shaped tube of any suitable material, such as steel. The ends 14A, 16A of the outer left and right frame members 14, 16 located adjacent the rear frame member 20 extend a short distance there beyond and have axles 24 thereon for pivotally mounting the peripheral frame structure 22 to any suitable support structure (not shown), such as a ceiling of a recreational vehicle, about a common horizontal axis of rotation R. As will become apparent from the description hereafter, the mounting bracket assemblies 12, which extend between the front and rear frame members 18, 20, mount a television T along one side of the frame 10 in a vibration-isolated relationship thereto. Suitable trim or a door (not shown) to cover or conceal the frame 10 in the ceiling may be attached to an opposite side of the frame 10.

Figure 2:
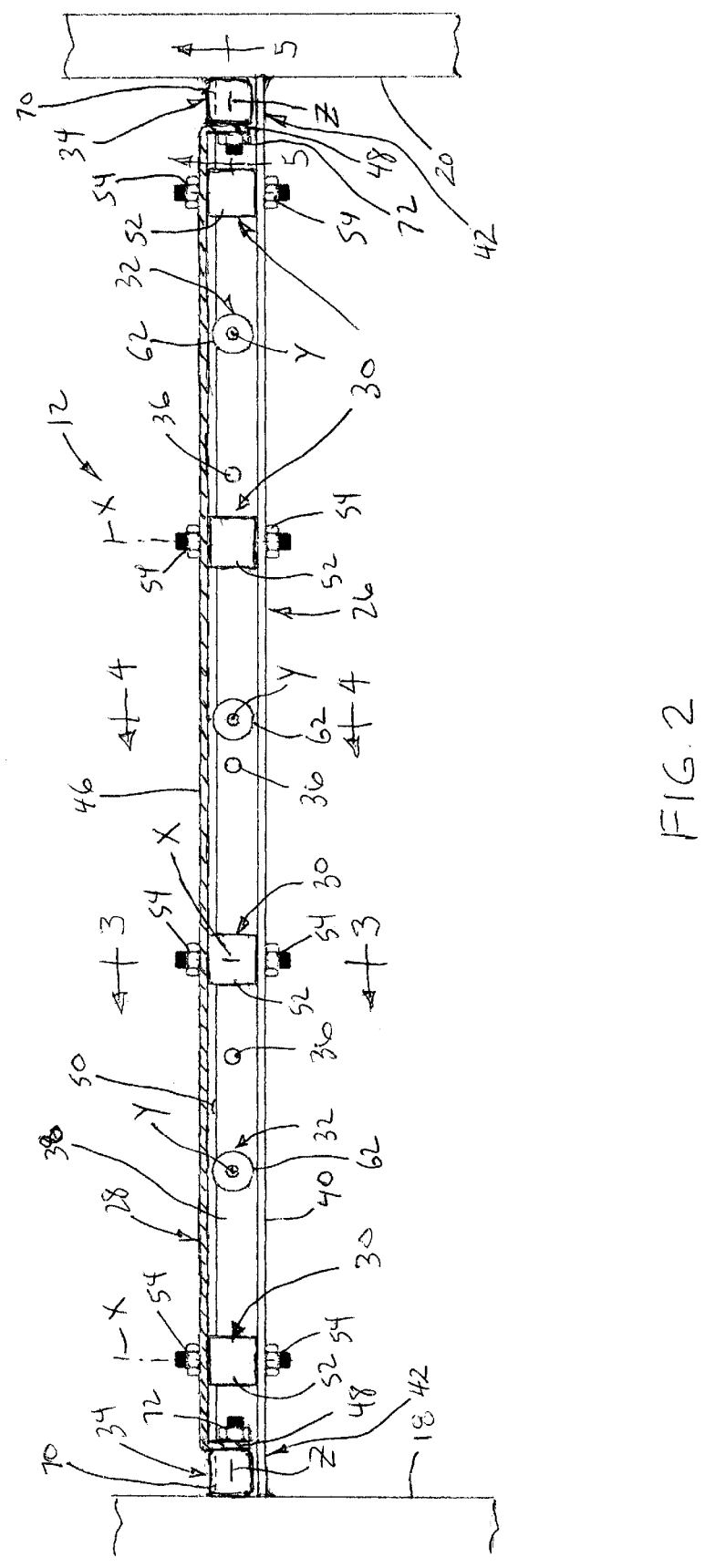

Referring now to FIGS. 1 and 2, each of the mounting bracket assemblies 12 basically includes a first or fixed mounting rail 26 extending between and rigidly connected to the opposite front and rear frame members 18, 20 of the peripheral frame structure 22, a second or floating mounting rail 28 extending generally parallel to and along the fixed mounting rail 26 and spaced therefrom and from the peripheral frame structure 22 and adapted to mount the television T. A plurality of vibration-dampening isolator elements 30, 32, 34 are disposed between and interconnect the floating mounting rail 28 to the fixed mounting rail 26 and to the front and rear frame members 18, 20 of the peripheral frame structure 22 so as to mount the second or floating mounting rail 28 to be floatably movable along generally orthogonal X, Y and Z axes, as seen in FIGS. 2–5, such that any vibrations imparted to the peripheral frame structure 22 will be prevented from reaching the floating mounting rails 28 which directly mount the television T. The floating mounting rails 28 of the mounting bracket assemblies 12 have suitable means, such as holes 36 formed therein, for receiving suitable fasteners (not shown) to mount the television T thereto along one of a pair of opposite faces or sides of the frame 10.

Figure 3:
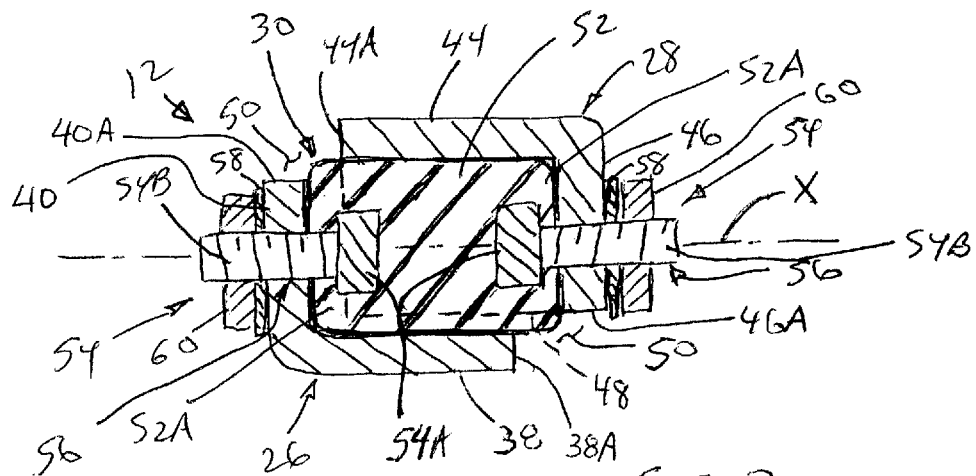
FIG. 3 is an enlarged sectional view of one of a plurality of first isolator elements mounted between a pair of floating and fixed mounting rails of the mounting bracket assembly, as taken along line 3—3 of FIG. 2, so as to provide vibration isolation between the floating and fixed mounting rails of the assembly along the X axis.
Figure 4:
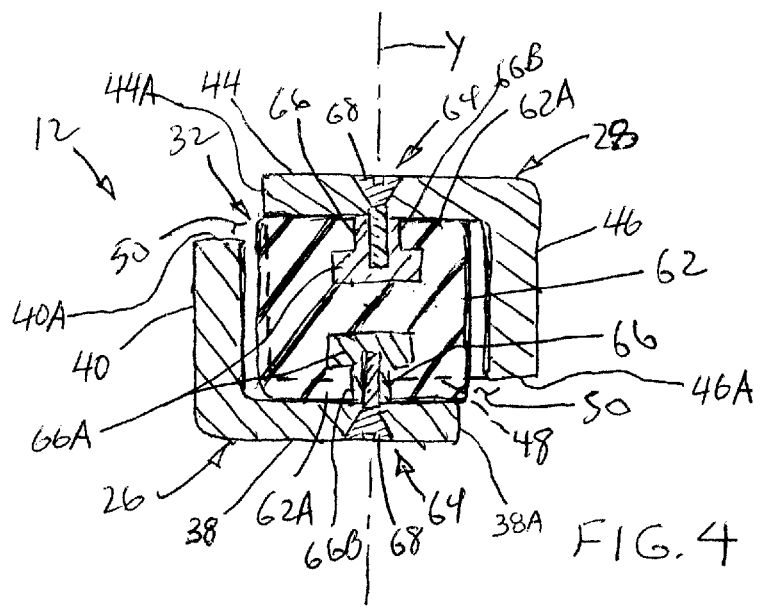
FIG. 4 is an enlarged sectional view of one of a plurality of second isolator elements mounted between the pair of floating and fixed mounting rails of the mounting bracket assembly, as taken along line 4—4 of FIG. 2, so as to provide vibration isolation between the floating and fixed mounting rails of the assembly along the Y axis.

Referring to FIGS. 2–4, there is seen in greater detail the fixed mounting rail 26 and floating mounting rail 28 of each mounting bracket assembly 12. The fixed mounting rail 26 has respective bottom and side portions 38, 40 rigidly connected together in an L-shaped cross-sectional configuration and defining a pair of longitudinal edges 38A, 40A of the fixed mounting rail 26. A pair of opposite ends 42 of the fixed mounting rail 26 are rigidly connected to the opposite front and rear frame members 18, 20 of the peripheral frame structure 22. The floating mounting rail 28 has respective top and side portions 44, 46 rigidly connected together in an L-shaped cross-sectional configuration and defining a pair of opposite end portions in the form of end caps 48 and also a pair of longitudinal edges 44A, 46A of the floating mounting rail 28. The top portion 44 of the floating mounting rail 28 is disposed in a spaced opposing relationship to the bottom portion 38 of the fixed mounting rail 26. The side portion 46 of the floating mounting rail 28 is disposed in a spaced opposing relationship to the side portion 40 of the fixed mounting rail 26. The respective longitudinal edges 38A, 40A and 44A, 46A of the fixed and floating mounting rails 26, 28 are also spaced from one another by respective gaps 50. The top portion 44 of the floating mounting rail 28 in each of the assemblies 12, being visibly present in FIGS. 3 and 4, has been omitted in FIGS. 1 and 2 in order to expose the vibration-dampening isolator elements 30, 32 which are between the fixed and floating mounting rails 26, 28.

Referring more specifically to FIG. 3, there is shown one of the four first vibration-dampening isolator elements 30 which is disposed between and interconnects the side portions 40, 46 of the respective fixed and floating mounting rails 26, 28 so as to mount the floating mounting rail 28 to be floatably movable along the X axis relative to the fixed mounting rail 26 and the peripheral frame structure 22. In such manner, the first isolator elements 30 provide vibration isolation between the floating and fixed mounting rails 28, 26 of the assembly 12 along the X axis defined by the first isolator elements 30.

More particularly, each first isolator element 30 includes an elongated body 52 made of a resiliently yieldable material, such as conventional rubber, and a pair of fasteners 54 attached to opposite ends 52A of the elongated body 52 and being fastened to the opposing side portions 40, 46 of the fixed and floating mounting rails 26, 28. By way of example, the fasteners 54 include bolts 56 which are embedded at their enlarged heads 56A in the molded material of the isolator element 30 at the time the latter is fabricated and having externally threaded stems 56B rigidly connected to the heads 56A and extending in opposite directions and in axial alignment with one another from the opposite ends 52A of the elongated body 52 so as to define and extend along the X axis of the first isolator element 30. The fasteners 54 also include washers 58 placed over the stems 56B and internally threaded nuts 60 threadably tightened about the threaded stems 56B to securely attach the opposite ends 52A of the body 52 to the opposing side portions 40, 46 of the fixed and floating mounting rails 26, 28.

Referring now to FIG. 4, there is shown one of three second isolator elements 32 which is disposed between and interconnects the bottom and top portions 38, 44 of the fixed and floating mounting rails 26, 28 so as to mount the floating mounting rail 28 to be floatably movable along the Y axis relative to the fixed mounting rail 26 and the peripheral frame structure 22. In such manner, the second isolator elements 32 provide vibration isolation between the floating and fixed mounting rails 28, 26 of the assembly 12 along the Y axis.

More particularly, each second isolator element 32 includes an elongated body 62 made of a resiliently yieldable material, such as conventional rubber, and a pair of fasteners 64 attached to opposite ends of the elongated body 62 and being fastened to the opposing bottom and top portions 38, 44 of fixed and floating mounting rails 26, 28. By way of example, the fasteners 64 include bolts 66 which are embedded at their enlarged heads 66A in the molded material of the isolator element 32 at the time the latter is fabricated and having internally threaded stems 66B rigidly connected to the heads 66A and extending in opposite directions and in axial alignment with one another from the opposite ends 62A of the elongated body 62 so as to define and extend along the Y axis of the second isolator element 32. The fasteners 64 also include externally threaded screws 68 threadably tightened into the internally threaded stems 66B to securely attach the opposite ends 62A of the body 62 to the bottom and top portions 38, 44 of the fixed and floating mounting rails 26, 28.

Figure 5:
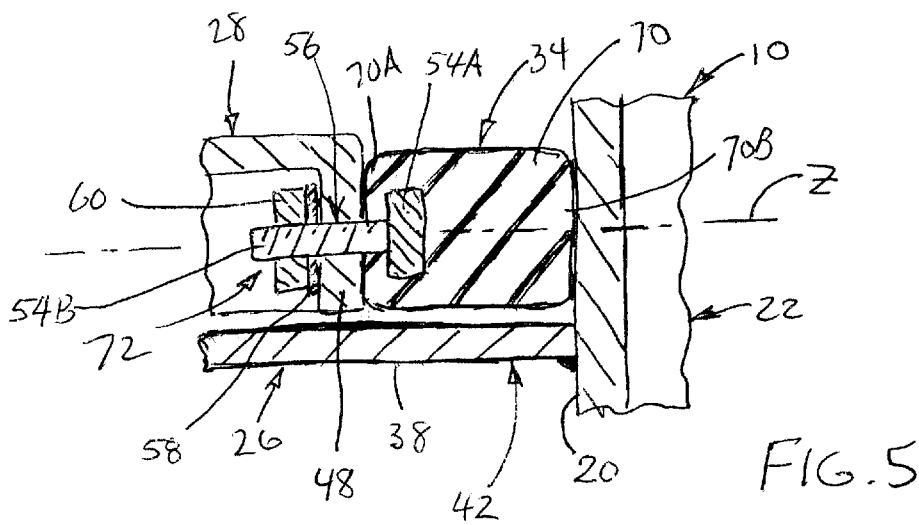
FIG. 5 is an enlarged sectional view of one of a plurality of third isolator elements mounted between the floating mounting rail of the mounting bracket assembly and one of the members of the frame, as taken along 5—5 of FIG. 2, so as to provide vibration isolation between the floating mounting rail of the assembly and the frame along the Z axis.

Referring finally to FIG. 5, there is depicted one of a pair of third isolator elements 34. Each third isolator element 34 is mounted between one of the end caps 48 of the floating mounting rail 28 and one of the front and rear frame members 18, 20 of the peripheral frame structure 22. In such manner, the third isolator elements 34 provide vibration isolation between the floating mounting rail 28 of the assembly and the peripheral frame structure 22 along the Z axis.

More particularly, each third isolator element 34 includes an elongated body 70 made of a resiliently yieldable material and a fastener 72 attached to only the inner one end 70A of a pair of opposite ends of the elongated body 70 and fastened to one of the opposing end caps 48 of the floating mounting rail 28. As an example, the fastener 72 has the same construction as the fastener 54 of the first isolator element 30 described above.

Each of the third isolator elements 34 used at the opposite end caps 48 of the floating mounting rail 38 has only the single fastener 72 so the outer ends 70B of the third isolator elements 34 seat against the front and rear frame members 18, 20 of the frame 10. Alternatively, the outer ends 70B of the third isolator elements 34 could also be attached to the frame 10. However, this changes the response of the assemblies 12 to the vibration. There will be a stiffer response along the Z axis because a vibration producing a compression of one of the third isolator elements 34 produces an elongation or extension of the opposite one of the third isolator elements 34. If the third isolator elements 34 are not attached to the frame 10, then there will only be a compression of the third isolator element 34 at one end of the floating mounting rail 28 and just a floating of the third isolator element 34 at the other end thereof.

From the foregoing description, it will be readily understood that the floating mounting rail 28 is mounted to the fixed mounting rail 26 through the first, second and third isolator elements 30, 32, 34 such that there is never a rigid fixed attachment of the floating mounting rail 28 to the fixed mounting rail 26 or the peripheral frame structure 22. Both the fixed and floating mounting rails 26, 28 are L-shaped in cross section so that floating mounting rail can be mounted to the fixed mounting rail 28 in both X and Y directions by the first and second isolator elements 30, 32 located therebetween and then the floating mounting rail 28 is mounted in the Z direction by the location of the third isolator elements 34 attached to the opposite end caps 48 of the floating mounting rail 28 and resting directly against but unattached to the front and rear frame members 18, 20 of the frame 10.

Durameter value is the hardness of the rubber or, in another sense, its resistance to deflection. For providing isolation in the X and Y directions, the rubber of the first and second isolator elements 30, 32 preferably has a durometer value of about 50. For isolation in the Z direction, the rubber of the third isolator elements 34 preferably has a durometer value of about 70. The third or end isolator elements 34 thus are of higher durameter value than the first and second isolator elements 30, 32. When the television is in the viewing position or the frame 10 is open and positioned vertically with reference to the floor of the recreation vehicle, the stiffer the third isolator elements 34 will support more weight without causing the first and second isolator elements 30, 32 to deflect beyond their recommended deflection.

Some of the advantages of the mounting bracket assemblies 12 used in the frame 10 of the present invention are as follows:

(1) They protect the television in all three axes at the same time, whether the frame 10 is open or closed.
(2) They allow for the trim to be mounted directly to the back face or side of the frame 10 due to the fact that the complete bracket assembly 12 is the same size as the frame members 14–20.
(3) With the isolation located directly at the television mounting location, it is not necessary to adjust the dampening for the weight of the door or trim mounted to the back side of the frame 10. If the isolation were located in the peripheral frame structure 22 the dampening would have to be adjusted for each different installation due to variances in the weight being dampened.
(4) They allow the door to be closed tightly against the surrounding ceiling without any effect on the isolation of the television. If the isolation were located in the peripheral frame structure 22, as soon as the door was closed and came in contact with the ceiling the isolation from the frame structure 22 would be lost and all vibration would be transmitted into the television.
(5) The durometer of specific components can be changed individually to accommodate a wide variety of television weights and isolation characteristics without affecting the overall size of the bracket assemblies 12.
(6) The bracket assemblies 12 will accept and isolate a broad spectrum of television brands without needing any changes by the end user in the bracket or components used to isolate the television.
(7) The vibration seen by the television in a mobile environment using this frame 10 is no greater than and in some instances less than the vibration seen in a fixed stationary environment of a building.
(8) And finally use of this frame 10 will eliminate many vibration induced failures in Plasma screen type televisions and monitors in a mobile environment when installed correctly.

While the invention has been described as having specific embodiments, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. A television supporting frame, comprising:
   (a) a peripheral frame structure; and
   (b) at least a pair of mounting bracket assemblies extending between opposite portions of said peripheral frame structure for mounting a television in a vibration-isolated relationship to said peripheral frame structure, each of said mounting bracket assemblies including
      (i) a first mounting rail extending between and rigidly connected to said opposite portions of said peripheral frame structure,
      (ii) a second mounting rail extending generally parallel to and along said first mounting rail and spaced therefrom and from said peripheral frame structure and adapted to mount the television, and
      (iii) a plurality of vibration-dampening elements disposed between and interconnecting said second mounting rail to said first mounting rail and to said opposite portions of said peripheral frame structure so as to mount said second mounting rail to be floatably movable along generally orthogonal X, Y and Z axes such that any vibrations imparted to said peripheral frame structure will be substantially prevented from reaching said second mounting rails and the television mounted thereto.

2. The frame of claim 1 wherein said first mounting rail has respective bottom and side portions rigidly connected together in an L-shaped cross-sectional configuration and defining a pair of longitudinal edges of said first mounting rail and a pair of opposite ends of said first mounting rail being rigidly connected to said opposite portions of said peripheral frame structure.

3. The frame of claim 2 wherein said second mounting rail has respective top and side portions rigidly connected together in an L-shaped cross-sectional configuration and defining a pair of opposite end portions and a pair of longitudinal edges of said second mounting rail, said bottom portion of said second mounting rail being disposed in a spaced opposing relationship to said bottom portion of said first mounting rail, said side portion of said second mounting rail being disposed in a spaced opposing relationship to said side portion of said first mounting rail, said respective longitudinal edges of said first and second mounting rail being spaced from one another.

4. The frame of claim 3 wherein said vibration-dampening elements include first vibration-dampening elements disposed between and interconnecting said side portions of said first and second mounting rails so as to mount said second mounting rail to be floatably movable along said X axis relative to said first mounting rail and said peripheral frame structure.

5. The frame of claim 4 wherein each of said first vibration-dampening elements includes an elongated body made of a resiliently yieldable material and a pair of fasteners attached to opposite ends of said elongated body and being attachable to said opposing side portions of said first and second mounting rails.

6. The frame of claim 3 wherein said vibration-dampening elements include second vibration-dampening elements disposed between and interconnecting said bottom and top portions of said first and second mounting rails so as to mount said second mounting rail to be floatably movable along said Y axis relative to said first mounting rail and said peripheral frame structure.

7. The frame of claim 6 wherein each of said second vibration-dampening elements includes an elongated body made of a resiliently yieldable material and a pair of fasteners attached to opposite ends of said elongated body and being attachable to said opposing bottom and top portions of said first and second mounting rails.

8. The frame of claim 3 wherein said vibration-dampening elements include third vibration-dampening elements disposed between and interconnecting said opposite end portions of said first mounting rails and opposite portions of said peripheral frame structure adjacent to said opposite ends of said first mounting rail so as to mount said second mounting rail to be floatably movable along said Z axis relative to said first mounting rail and said peripheral frame structure.

9. The frame of claim 8 wherein said each of said third vibration-dampening elements includes an elongated body made of a resiliently yieldable material and a fastener attached to one of a pair of opposite end of said elongated body and being attachable to one of said opposing end portions of said second mounting rail.

10. A television supporting frame, comprising:
(a) a peripheral frame structure having front and rear portions spaced apart from one another and opposite side portions spaced apart from one another and extending between and rigidly connected to said front and rear portions such that said peripheral frame structure encloses a space and is adapted to pivot about an axis of rotation extending parallel to said front and rear portions and located adjacent to said rear portion; and
(b) at least a pair of vibration-isolating mounting bracket assemblies spaced apart from one another and disposed in said space of said peripheral frame structure and extending between said front and rear portions of said peripheral frame structure and spaced inwardly said opposite side portions of said peripheral frame structure, each of said mounting bracket assemblies including
  (i) a first mounting rail extending between and having a pair of opposite ends rigidly connected to said front and rear portions of said peripheral frame structure,
  (ii) a second mounting rail extending along and generally parallel to and being spaced from said first mounting rail and extending between said front and rear portions of said peripheral frame structure, said second mounting rail having a pair of opposite ends spaced from said front and rear portions and said opposite side portions of said peripheral frame structure such that said second mounting rail is not directly connected to said peripheral frame structure, said second mounting rails of said mounting bracket assemblies having means for mounting a television thereto, and
  (iii) a plurality of vibration-dampening elements each made of resiliently yieldable material, first ones and second ones of said elements being disposed between and interconnecting said first and second mounting rails so as to mount said second mounting rail to be floatably movable relative to said first mounting rail along generally orthogonal X and Y axes, and third ones of said elements being disposed between said opposite ends of said second mounting rail and said front and rear portions of said peripheral frame structure so as to mount said second mounting rail to be floatably movable relative to said front and rear portions of said peripheral frame structure along a Z axis generally orthogonal to said X and Y axes such that any vibrations imparted to said peripheral frame structure will be substantially prevented from reaching said second mounting rails and the television mounted thereto.

11. The frame of claim 10 wherein said first mounting rail has respective bottom and side portions rigidly connected together in an L-shaped cross-sectional configuration and defining a pair of longitudinal edges of said first mounting rail and a pair of opposite ends of said first mounting rail being rigidly connected to said opposite portions of said peripheral frame structure.

12. The frame of claim 11 wherein said second mounting rail has respective top and side portions rigidly connected together in an L-shaped cross-sectional configuration and defining a pair of opposite end portions and a pair of longitudinal edges of said second mounting rail, said top portion of said second mounting rail being disposed in a spaced opposing relationship to said bottom portion of said first mounting rail, said side portion of said second mounting rail being disposed in a spaced opposing relationship to said side portion of said first mounting rail, said respective longitudinal edges of said first and second mounting rails being spaced from one another.

13. The frame of claim 12 wherein said first ones of said vibration-dampening elements are disposed between and interconnect said side portions of said first and second mounting rails so as to mount said second mounting rail to be floatably movable along said X axis relative to said first mounting rail and said peripheral frame structure.

14. The frame of claim 13 wherein each of said first ones of said vibration-dampening elements includes an elongated body made of a resiliently yieldable material and a pair of fasteners attached to opposite ends of said elongated body and being attachable to said opposing side portions of said first and second mounting rails.

15. The frame of claim 14 wherein said second ones of said vibration-dampening elements are disposed between and interconnect said bottom and top portions of said first and second mounting rails so as to mount said second mounting rail to be floatably movable along said Y axis relative to said first mounting rail and said peripheral frame structure.

16. The frame of claim 15 wherein each of said second ones of said vibration-dampening elements includes an elongated body made of a resiliently yieldable material and a pair of fasteners attached to opposite ends of said elongated body and being attachable to said opposing bottom and top portions of said first and second mounting rails.

17. The frame of claim 16 wherein said third ones of said vibration-dampening elements are disposed between and interconnect said opposite end portions of said first mounting rails and said front and rear portions of said peripheral frame structure adjacent to said opposite ends of said first mounting rail so as to mount said second mounting rail to be floatably movable along said Z axis relative to said first mounting rail and said peripheral frame structure.

18. The frame of claim 17 wherein said each of said third ones of said vibration-dampening elements include an elongated body made of a resiliently yieldable material and a fastener attached to one of a pair of opposite end of said elongated body and being attachable to one of said opposing end portions of said second mounting rail.

19. The frame of claim 18 wherein said elongated body of said third ones of said vibration-dampening elements has a durometer value greater than a durometer value of said elongated body of each of said first and second ones of said vibration-dampening elements.

20. The frame of claim 18 wherein said resiliently yieldable material making up said elongated bodies of said first, second and third ones of said vibration-dampening elements is a rubber material.

* * * * *